United States Patent [19]

Jun

[11] Patent Number: 5,455,405
[45] Date of Patent: Oct. 3, 1995

[54] NOISE SHIELDING APPARATUS FOR MAGNETRON OF MICROWAVE OVEN

[75] Inventor: Wookeum Jun, Kyeongki-do, Rep. of Korea

[73] Assignee: Daewoo Electronics Co., Ltd., Seoul, Rep. of Korea

[21] Appl. No.: 307,129

[22] Filed: Sep. 16, 1994

[30] Foreign Application Priority Data

Sep. 18, 1993 [KR] Rep. of Korea ............... 93-18957

[51] Int. Cl.⁶ .................. H05B 6/64; H01G 4/42
[52] U.S. Cl. .............. 219/761; 219/738; 361/302; 315/39.51
[58] Field of Search .............. 219/761, 736, 219/738; 361/302, 330; 315/39.51, 39.53; 174/35 R

[56] References Cited

U.S. PATENT DOCUMENTS

| | | | |
|---|---|---|---|
| 4,370,698 | 1/1983 | Sasaki | 361/302 |
| 4,811,161 | 3/1989 | Sasaki et al. | 361/302 |
| 4,814,938 | 3/1989 | Arakawa et al. | 361/302 |
| 5,142,436 | 8/1992 | Lee et al. | 361/302 |
| 5,206,786 | 4/1993 | Lee | 361/302 |
| 5,313,139 | 5/1994 | Yoon | 315/39.51 |

Primary Examiner—Philip H. Leung
Attorney, Agent, or Firm—Lowe, Price, LeBlanc & Becker

[57] ABSTRACT

A noise shielding apparatus for the magnetron of a microwave oven is disclosed, in which the structure is relatively simple, so that the material cost would be saved, and that the productivity would be improved. An elliptic opening is formed on a side wall of a shielding case for installing a capacitor. The circumference of the opening is bent to form a projected portion for attaching a capacitor, and a recess is formed on the reverse side of the projected portion. Further, reinforcing ribs are formed around the projected portion of the shielding case. In the present invention, attaching a conventional separate ground fitment is unnecessary, so that the productivity would be improved. Further, since the holes for fastening the ground fitment are not required, the noise is not leaked through the holes.

6 Claims, 4 Drawing Sheets

NOISE SHIELDING APPARATUS FOR MAGNETRON OF MICROWAVE OVEN

BACKGROUND OF THE INVENTION

1. Field of the Invention

The present invention relates to a noise shielding apparatus in which a noise generated in a magnetron of a microwave oven can be effectively shielded. More particularly, the present invention relates to a noise shielding apparatus in which the structure of the shielding apparatus is simple, but the performance is very high, so that the productivity can be improved, and that the overall manufacturing cost can be saved.

2. Prior Arts

Generally, various apparatus such as home microwave ovens, commercial thawing apparatuses, industrial driers and the like using microwaves are provided with a magnetron for generating microwaves, and a capacitor for shielding noises.

In an electric field room of a microwave oven, there is provided a magnetron for generating microwaves. Such microwaves are generated when a high voltage produced by primary and secondary induction coils of a high voltage transformer which is attached on a base plate of the electric field room, is stably supplied to the magnetron, the high voltages being generated through the inductive interaction between the induction coils. Such microwaves are irradiated into a cooking chamber through an irradiating tube.

When the microwaves are irradiated into the cooking chamber after passing through the irradiating tube, the food placed within the cooking chamber is heated so as to be cooked.

The power supply line of the magnetron is mainly consisted of a filament, a cathode and an anode. When the high voltage is supplied to the magnetron to generate microwaves, unnecessarily radiated microwaves, i.e., noises are generated, besides microwaves having basic frequencies which are suitable for heating the food. Then, the noises flow back through the filament and the cathode so as to cause wave obstructions in the nearby apparatuses.

Particularly, coming recently, television broadcasts resorting to satellites are widely utilized. The unnecessary microwaves of the magnetron interacts with the broadcasting frequencies and therefore there is a possibility that receiving disorders may occur on a television receiver.

In order to reduce such adverse influences given to the nearby apparatuses due to the magnetron noise, a choke coil and a capacitor connected thereto are provided on the cathode which supplies power to the filament. The choke coil which has a reactance, and the capacitor which is connected to the choke coil absorb the unnecessary microwaves, thereby blocking the leakage of the unnecessary microwaves.

The choke coil is sealed within a shielding case which is provided under the magnetron, while the capacitor is installed on the outside of the shielding case. One end of the choke coil is connected to the power supply line of the filament, while the other end is connected to a lead line of the capacitor.

The widely used capacitor is a through-type, and such a through-type capacitor is described in U.S. Pat. No. 4,811,161 (issued to Sasaki et al). In the magnetron using the through-type capacitor, the choke coil is connected in series between the cathode of the magnetron and a through conductor of the through-type capacitor which is inserted in a side wall of the shielding case.

FIG. 1 is an exploded perspective view of a noise shielding apparatus including a conventional through-type capacitor 30 and FIG. 2 is a front sectional view of through-type capacitor 30 of FIG. 1.

As shown in the drawings, the conventional through-type capacitor 30 includes an elliptic ceramic dielectric 32. Ceramic dielectric 32 is provided with a pair of vertical through holes 34 which are formed in parallel with each other. On the upper surface of ceramic dielectric 32, there are provided a pair of electrodes 36 which are separated from each other, while a common electrode 38 is provided on the lower surface of ceramic dielectric 32. Separated electrodes 36 and common electrode 38 are provided with through holes corresponding to through hole 34 of ceramic dielectric 32. Capacitor 30 further includes a ground fitment 40 made of a metal in which an elliptic opening 42 is formed at a center portion thereof, on which there is formed an upstand 44 along the circumference of opening 42 with a suitable height. Ceramic dielectric 32 is fixed via common electrode 38 on upstand 44 of ground fitment 40 by a proper means such as soldering or the like.

Further, capacitor 30 includes a pair of through conductors 46 each covered with an insulation tube 48, insulation tube 48 being formed of a suitable material such as silicon. Insulation tube 48 is inserted into through hole 34, and opening 42 and through conductor 46 each are fittedly secured in an electrode connectors 50 each of which is fixed on separated electrodes 36 by a proper means such as soldering or the like. Fixing of through conductor 46 to electrode connector 50 may be carried out by soldering or the like.

Ground fitment 40 is formed by pressing a metal plate in such a manner that upstand 44 should surround opening 42 in a projected contour, and that the other side of ground fitment 40 is provided with a recess 52 so as to form the inner surface of upstand 44. At the four corner portions of ground fitment 40, there are formed four piercing holes 41, so that ground fitment 40 may be attached to a shielding case (which is also called a "filter box") 90.

Capacitor 30 further includes an insulation case 54 which surrounds ceramic dielectric 32 and an insulation cylinder 56 which surrounds through conductor 46. The lower portion of insulation case 54 is secured to upstand 44 of ground fitment 40, while the upper portion of insulation cylinder 56 is secured by recess 52 of ground fitment 40. Insulation case 54 and insulation cylinder 56 are filled with an insulation resin material such as an epoxy resin or the like so as to cover an outside and inside of ceramic dielectric 32 with the resin or embed it therein to thereby ensure moisture proofness and insulation properties of ceramic electric. Insulation case 54 and insulation cylinder 56 are made of thermoplastic resin such as polybutylene terepthalate (PBT).

Each through conductor 46 is integrally provided with a fastening tab 62 on one end thereof which is to be received into insulation case 54 for applying a high voltage. One end of fastening tab 62 projects from one end of insulation case 54, so that the tab can be easily connected to an external terminal.

When ground fitment 40 is fixedly secured on shielding case 90, shielding case 90 is provided with a large hole 91 corresponding to the capacitor and four bearing holes 92 corresponding to four piercing holes 41 of ground fitment 40. Then bearing holes 92 and piercing holes 41 are matched to assemble them using bolts.

Through-type capacitor 30 which connects the choke coil of the interior of shielding case 90 with an external terminal inhibits the conducting noise from conducting through the lead, and also shields a radiating noise. However, as shown in the drawings, the conventional noise shielding apparatus of a magnetron includes many components assembled together, and therefore, not only the structure is complicated so as to increase the material cost, but also the assembling process is very fastidious so as to lower the productivity. Further, after the assembling, a considerable amount of radiating waves is leaked through insertion hole 91 of shielding case 90, holes 41 of ground fitment 40 and burring holes 92 of shielding case 90, with the result that the shielding of the noise cannot be maximized.

Therefore, magnetron manufacturers are expending efforts to simplify the structure of the capacitor, or to design a new structure in replace of that of the conventional capacitor.

SUMMARY OF THE INVENTION

The present invention is intended to overcome the above described disadvantages of the conventional technique.

Therefore, it is the object of the present invention to provide a noise shielding apparatus for the magnetron of a microwave oven, in which the structure is relatively simple, so that the material cost would be saved, and that the productivity would be improved.

For achieving the above object, the noise shielding apparatus according to the present invention includes:

a shielding case having an elliptic opening on a side wall thereof, a projected portion formed along the elliptic opening by bending out a circumference portion of the elliptic opening, and a recess formed on an inner surface portion thereof corresponding to the projected portion;

an elliptic cylindrical ceramic dielectric having a size corresponding to that of the elliptic opening of the shielding case, and having a pair of through holes;

a pair of separated electrodes separately formed on an upper surface of the ceramic dielectric;

a common electrode formed on a lower surface of the ceramic dielectric and oppositely from the separated electrodes;

a pair of through conductors passing through a pair of the through holes and connected to a choke coil of the magnetron;

an insulation case with its lower portion secured on the projected portion of the shielding case for surrounding the ceramic dielectric; and an elliptic insulation cylinder with its upper portion secured in the recess of the shielding case for surrounding a pair of the through conductors.

According to a preferred embodiment of the present invention, a rib is formed around the circumference of the projected portion of the shielding case for reinforcing the strength of the shielding case.

Further, an insulation resin is filled into the insulation case so as to surround an inside and outside of the ceramic dielectric, while an insulation resin is filled in an upper portion of the insulation cylinder so as to surround the through conductors.

Further, a securing tab is formed on the upper portion of a through conductor, and insulation tubes surround the through conductors, so that the insulation tubes would pass through the through holes of the ceramic dielectric.

The shielding case is provided with a projected portion which performs the role of the conventional ground fitment. Therefore, a ground fitment is unnecessary, with the result that the material cost is saved, and that the process for assembling the ground fitment can be skipped, thereby making it possible to improve the productivity. Also, since the conventional holes for securing ground fitment to shielding case are unnecessary, shielding the microwave noise can be performed effectively.

BRIEF DESCRIPTION OF THE DRAWINGS

The above objects and other advantages of the present invention will become more apparent by describing in detail a preferred embodiment thereof with reference to the attached drawings in which.

DESCRIPTION OF THE PREFERRED EMBODIMENT

Hereinafter, the present invention will be described in detail referring to the accompanying drawings.

Figure 3:
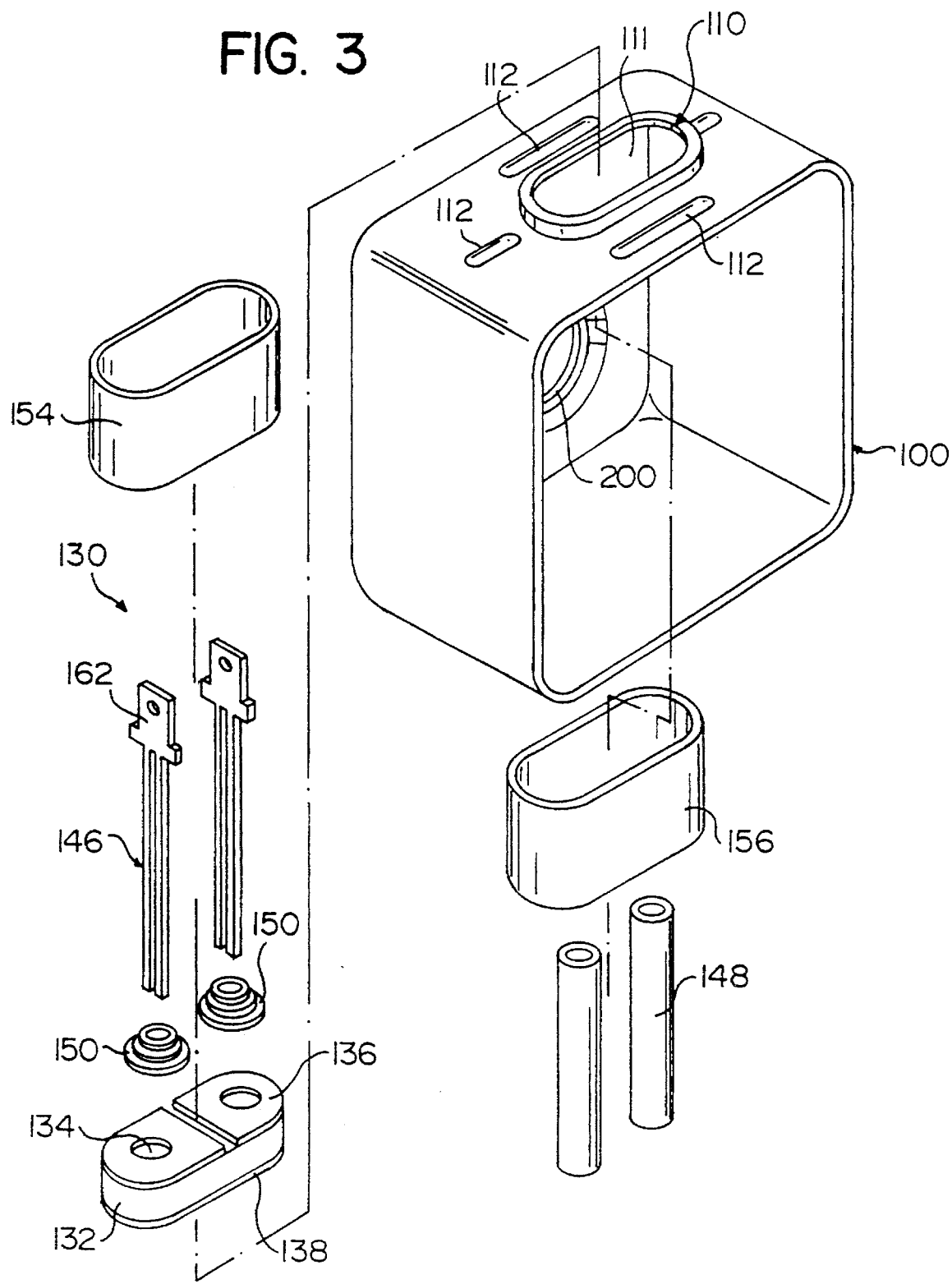
FIG. 3 is an exploded perspective view of a noise shielding apparatus according to one embodiment of the present invention.
Figure 4:
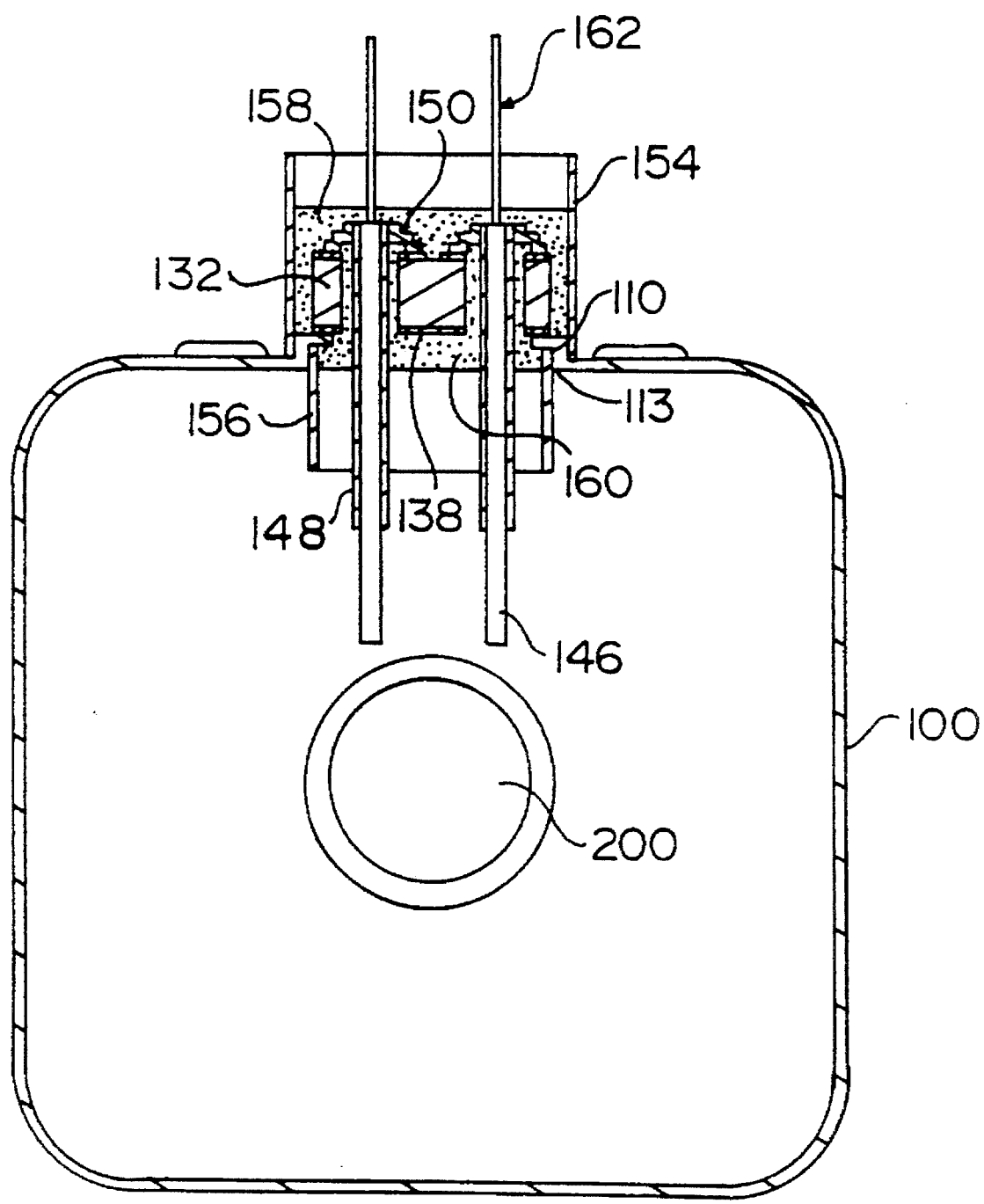
FIG. 4 is a front sectional view of the noise shielding apparatus of FIG. 3.

FIG. 3 is an exploded perspective view of a noise shielding apparatus according to the present invention, and FIG. 4 is a front sectional view of the noise shielding apparatus of FIG. 3.

The noise shielding apparatus according to the present invention includes a through-type capacitor 130 which is similar to the conventional capacitor. Capacitor 130 includes an elliptic ceramic dielectric 132, and ceramic dielectric 132 is provided with a pair of vertical through holes 134 which are substantially parallel with each other. Further, a pair of mutually separated electrodes 136 are provided on the top of ceramic dielectric 132, while a common electrode 138 is provided on the bottom of the ceramic dielectric 132. Separated electrodes 136 and common electrode 138 are provided with through holes corresponding to through holes 134 of ceramic dielectric 132.

Capacitor 130 is secured to a shielding case 100 which is provided with an elliptic opening 111 at a center portion of a side wall thereof for receiving capacitor 130. Further, an opening 200 is formed at a center portion of an upper portion of shielding case 100 for receiving the cathode of a magnetron, while the lower portion of shielding case 100 is totally open. A projected portion 110 is formed with a proper height around opening 11 by protrudingly bending a circumference portion of opening 111. On an inner surface portion of shielding case 100, a recess 113 is formed corresponding to projected portion 110. Around projected portion 110 and on the surface portions of shielding case 100, there are formed reinforcing ribs 112 for reinforcing the strength of shielding case 100.

Ceramic dielectric 132 is secured to projected portion 110 of shielding case 100 by fixing common electrode 138 to projected portion 110 by a proper means such as soldering or the like.

Capacitor 130 includes a pair of through conductors 146 each surrounded by an insulation tube 148 which is made of a proper material such as silicon. Through conductors 146 are disposed at a center portion of shielding case 100, and are connected to a choke coil which is connected to the filament of the magnetron, connecting through conductors 146 with the filament being made by a proper means such as soldering or the like. Insulation tubes 148 are inserted into through holes 134, and opening 111 and through conductors 146 are fixed to electrode connectors 150 which are secured on separate electrodes 136. Fixing through conductors 146 on electrode connectors 150 can be performed by a proper means such as soldering or the like.

Capacitor 130 also includes an insulation case 154 and an insulation cylinder 156. The lower portion of insulation case 154 which surrounds ceramic dielectric 132 is secured on projected portion 110, while the upper portion of insulation cylinder 156 which surrounds through conductors 146 is secured in recess 113 of shielding case 100. Insulation case 154 and insulation cylinder 156 are filled with an insulation resin such as an epoxy resin so as to cover an outside and inside of ceramic dielectric 132 to thereby ensure its moisture proofness and its insulation properties. Insulation case 154 and insulation cylinder 156 are formed of a thermoplastic resin such as PBT.

Through conductor 146 is integrally provided with a securing tab 162 to which a high voltage is applied. Securing tab is received into insulation case 154, so that an end portion of securing tab 62 would project from insulation case 154, thereby making it easy to be connected to an external terminal.

In the case where the noise shielding apparatus of the present invention is used, if a microwave noise which is generated from the magnetron flows reversely, the microwave noise passes through the choke coil which is connected to the filament of the magnetron, with the result that a portion of the noise is offset owing to the reactance of the coil. The rest of the microwave noise passes through through conductors 146 which are connected to the choke coil, and during this passing, a portion thereof is vanished by the capacitor which includes ceramic dielectric 132 (in which through conductors 146 are inserted). The last remaining portion of the noise is completely dissipated by being grounded to shielding case 100 which is connected with the common electrode 138.

Figure 1:
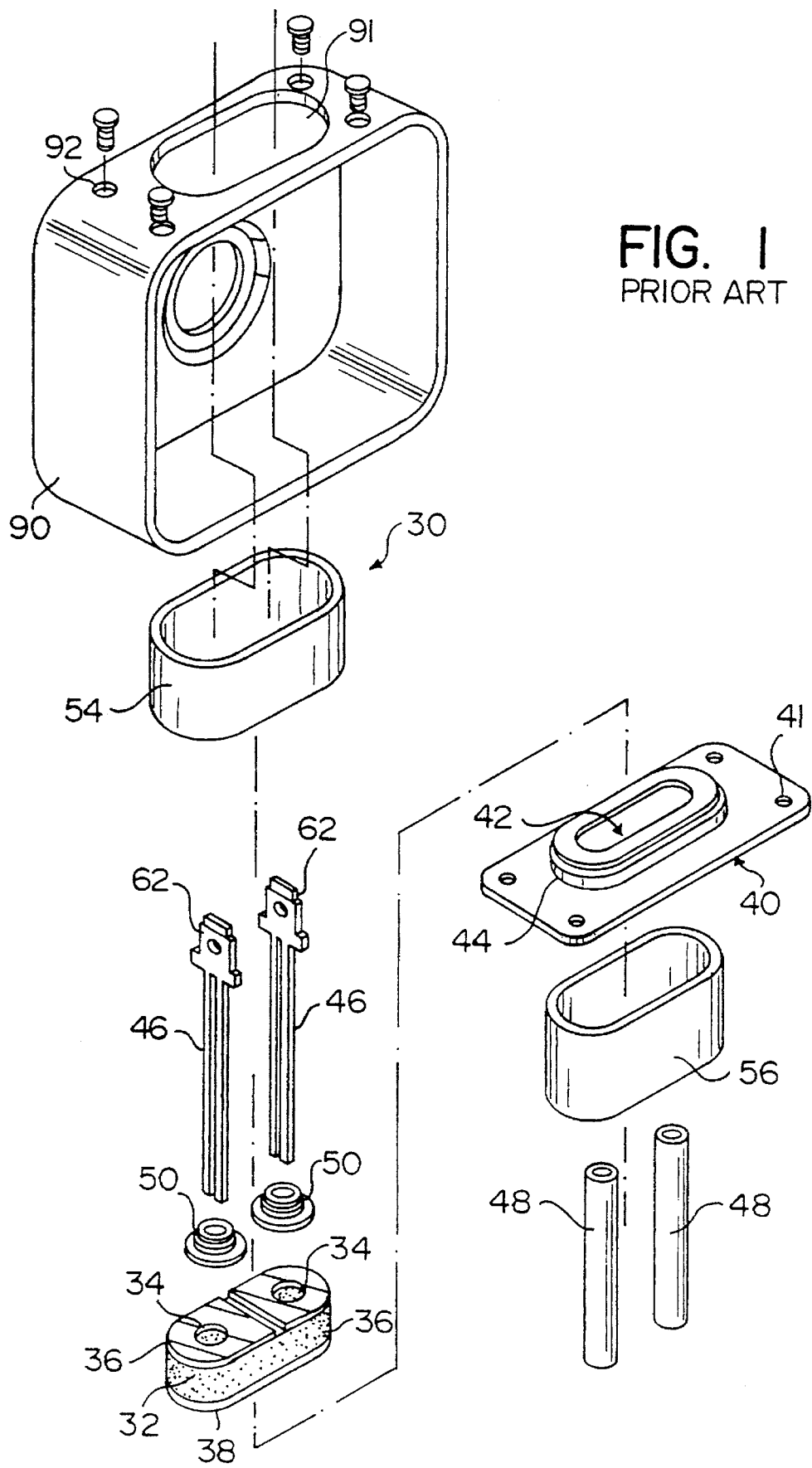
FIG. 1 is an exploded perspective view of a conventional noise shielding apparatus including a through-type capacitor.
Figure 2:
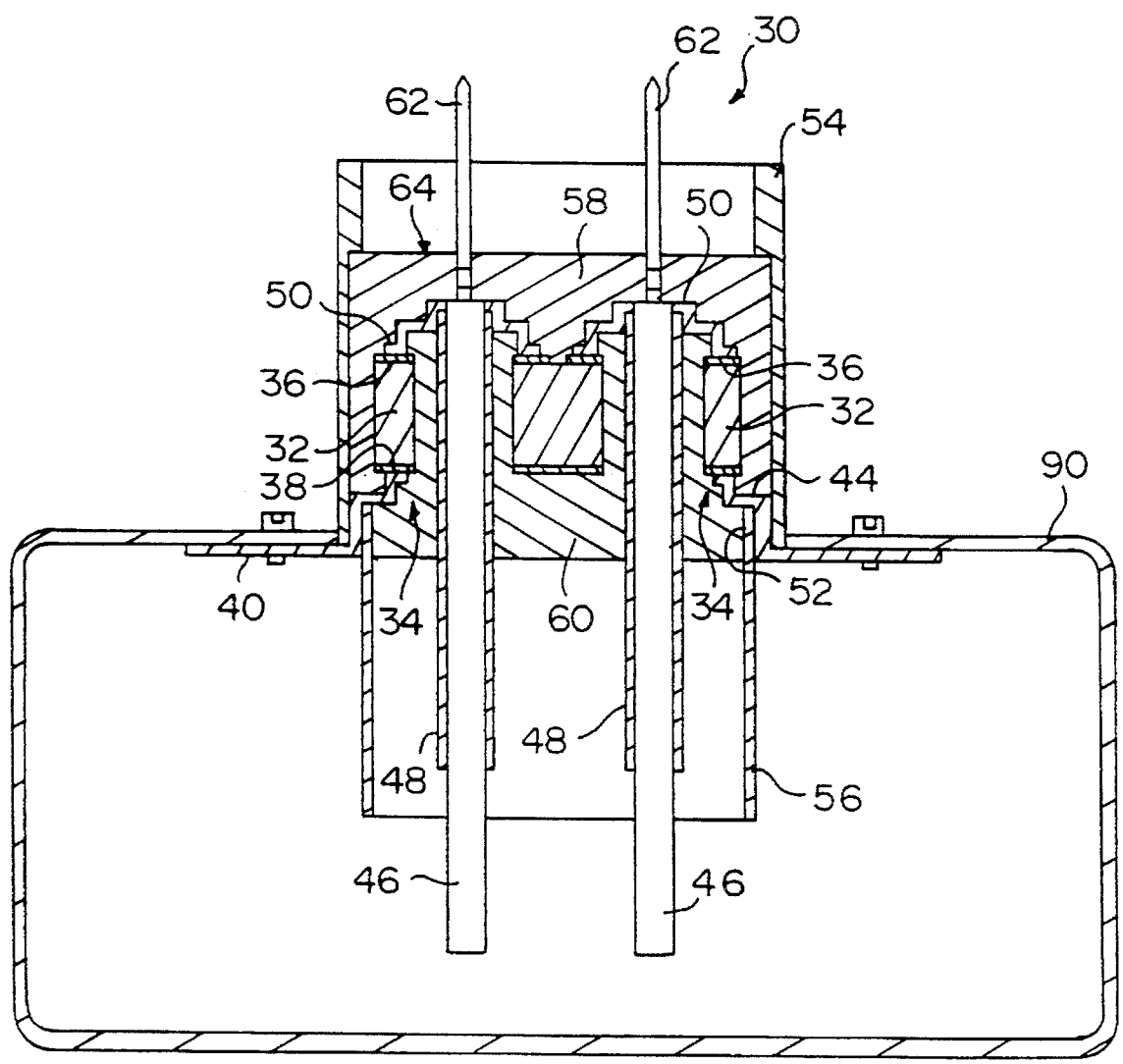
FIG. 2 is a frontal view of the noise shielding apparatus of FIG. 1.

In the present invention, shielding case 100 is punched and bent so as to form the projected portion 110 around opening 111. Projected portion 110 performs the role of the conventional ground fitment (40 in FIG. 1) which is fixedly installed on the shielding case.

Since projected portion 110 effectively performs the role of the conventional ground fitment 40, there is not required a separate ground fitment. Therefore, the material cost is saved, and a working process for installing ground fitment 40 is unnecessary, thereby making it possible to improve the productivity.

Further, the microwave noise which is generated by the magnetron is continuously dissipated by the ceramic dielectric during passing through through conductors 146 which are inserted in ceramic dielectric 132. Then, the noise is completely dissipated by being grounded to shielding case 100 which is connected to common electrode 138. In the present invention, when compared to a conventional apparatus, projected portion 110 which performs the role of the conventional ground fitment is integrally formed on shielding case 100. Therefore, the surface of common electrode 138 of ceramic dielectric 132 directly contacts with the surface of projected portion 110, and therefore, the grounding resistance is reduced. Therefore, the microwave noise is effectively grounded to shielding case 100 so as to be completely dissipated.

Further, according to the present invention, the conventional holes for securing ground fitment 40 to shielding case 100 are unnecessary. On the other hand, in the conventional apparatus, when ground fitment 40 is secured to shielding case 100, shielding case 100 has to be provided with four fastening holes, and therefore, the microwave noise is leaked through the four holes of shielding case 100. Therefore, in the present invention unlike the conventional apparatus, there is no possibility that noise may be leaked through the four holes of shielding case 100.

Further, forming reinforcing ribs 112 around projected portion 110 improves the strength of shielding case 100.

According to the present invention as described above, projected portion 110 is integrally formed on shielding case 100 so that projected portion 110 may effectively perform the role of the conventional ground fitment. Thus a separate ground fitment is unnecessary, with the result that the material cost is saved, and that the working process of securing the ground fitment is unnecessary, to thereby improve the productivity.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A noise shielding apparatus for a magnetron, comprising:

a shielding case having an elliptic opening on a side wall thereof and a projected portion formed along said elliptic opening by bending out a circumference portion of said elliptic opening, and a recess formed on an inner surface thereof corresponding to said projected portion;

an elliptic cylindrical ceramic dielectric having a size corresponding to said elliptic opening of said shielding case, and having a pair of through holes;

a pair of separated electrodes separately formed on an upper surface of said ceramic dielectric;

a common electrode formed on a lower surface of said ceramic dielectric and oppositely from said separated electrodes;

a pair of through conductors passing through said through holes and to be connected to a choke coil of the magnetron;

an insulation case with a lower portion secured on said projected portion of said shielding case for surrounding said ceramic dielectric; and an elliptic insulation cylinder with its upper portion secured in said recess of said shielding case for surrounding said through conductors.

2. The noise shielding apparatus as claimed in claim 1, said noise shielding apparatus further comprising a rib formed around said projected portion on said shielding case for reinforcing a strength of said shielding case.

3. The noise shielding apparatus as claimed in claim 1, said noise shielding apparatus further comprising an insulation resin filled within said insulation case so as to surround said ceramic dielectric.

4. The noise shielding apparatus as claimed in claim 1, said noise shielding apparatus further comprising an insulation resin filled in an upper portion of said insulation cylinder so as to surround said through conductors.

5. The noise shielding apparatus as claimed in claim 1, said noise shielding apparatus further comprising a securing tab formed on an upper portion of said through conductors for being connected to an external terminal, and said securing tab being extended outside of said insulation case.

6. The noise shielding apparatus as claimed in claim 1, said noise shielding apparatus further comprising a pair of insulation tubes surrounding a pair of said through conductors, respectively.

* * * * *